(12) United States Patent
Park et al.

(10) Patent No.: US 9,131,331 B2
(45) Date of Patent: Sep. 8, 2015

(54) DEVICE DISCOVERY WITH PRIVACY SUPPORT

(71) Applicant: Intel Corporation, Santa Clara, CA (US)

(72) Inventors: Minyoung Park, Portland, OR (US); Emily H. Qi, Portland, OR (US); Po-Kai Huang, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 84 days.

(21) Appl. No.: 13/931,323

(22) Filed: Jun. 28, 2013

(65) Prior Publication Data

US 2014/0256262 A1    Sep. 11, 2014

Related U.S. Application Data

(60) Provisional application No. 61/775,294, filed on Mar. 8, 2013.

(51) Int. Cl.
*H04W 8/00* (2009.01)
*H04W 12/02* (2009.01)
*H04L 29/06* (2006.01)

(52) U.S. Cl.
CPC ........... *H04W 8/005* (2013.01); *H04L 63/0407* (2013.01); *H04W 12/02* (2013.01)

(58) Field of Classification Search
CPC .............................. H04W 12/02; H04W 8/005
USPC ......................................................... 455/41.2
See application file for complete search history.

(56) References Cited

U.S. PATENT DOCUMENTS

| | | |
|---|---|---|
| 2007/0026846 A1 | 2/2007 | Bird et al. |
| 2010/0279686 A1 | 11/2010 | Tokgoz et al. |
| 2011/0145397 A1 | 6/2011 | Burns et al. |

FOREIGN PATENT DOCUMENTS

WO    0137597    5/2001

OTHER PUBLICATIONS

International Search Report and Written Opinion, mail date Jun. 26, 2014, PCT/ISA/210, PCT/ISA/220, PCT/ISA/237.

*Primary Examiner* — Eugene Yun
(74) *Attorney, Agent, or Firm* — Pillsbury Winthrop Shaw Pittman LLP

(57) ABSTRACT

Systems, methods, and devices are directed to wireless proximate-based communications with privacy support. A first wireless communication device is configured to discover and wirelessly communicate with one or more proximately-located wireless devices. The first wireless communication device includes logic configured to generate a temporary transformed address and expiration time and to format the temporary transformed address and expiration time into a packet and a communications module configured to transmit the packet directly to the one or more proximately-located wireless devices during discovery. The first wireless communication device is capable of exchanging information directly with the one or more proximately-located wireless devices based on the transformed address, until the expiration time has lapsed.

20 Claims, 3 Drawing Sheets

DEVICE DISCOVERY WITH PRIVACY SUPPORT

CROSS-REFERENCE TO RELATED APPLICATIONS

This application claims priority from U.S. Provisional Application No. 61/775,294, filed on Mar. 8, 2013, which is incorporated herein by reference in its entirety.

TECHNICAL FIELD

This disclosure relates generally to the field of wireless communications, and in particular, to wireless proximity-based communications systems and methods.

BACKGROUND ART

Recently, wireless communication systems based on decentralized architectures have gained much interest given their level of flexibility and user convenience. In such architectures, wireless devices may establish connectivity and communicate directly with each other, by virtue of proximity-based communications, without having to route messages or control information through a centralized network controller. To achieve this, wireless devices are configured with a device-to-device (D2D) discovery feature that enables a wireless device to publish its service information and/or discover other similarly-equipped wireless device service information, so that wireless devices are aware of available services within a certain vicinity.

However, when a wireless device publishes and/or discovers available services within its proximity, the D2D discovery process broadcasts service information with the MAC address of the wireless device. In so doing, other devices within the proximity of the wireless device may be capable of "listening in" to the broadcasted service information and may store the MAC address and service information of the received service information frames. As such, there exists the possibility that wireless devices may be tracked if a single fixed MAC address is used for the D2D discovery process.

DETAILED DESCRIPTION

Figure 1:
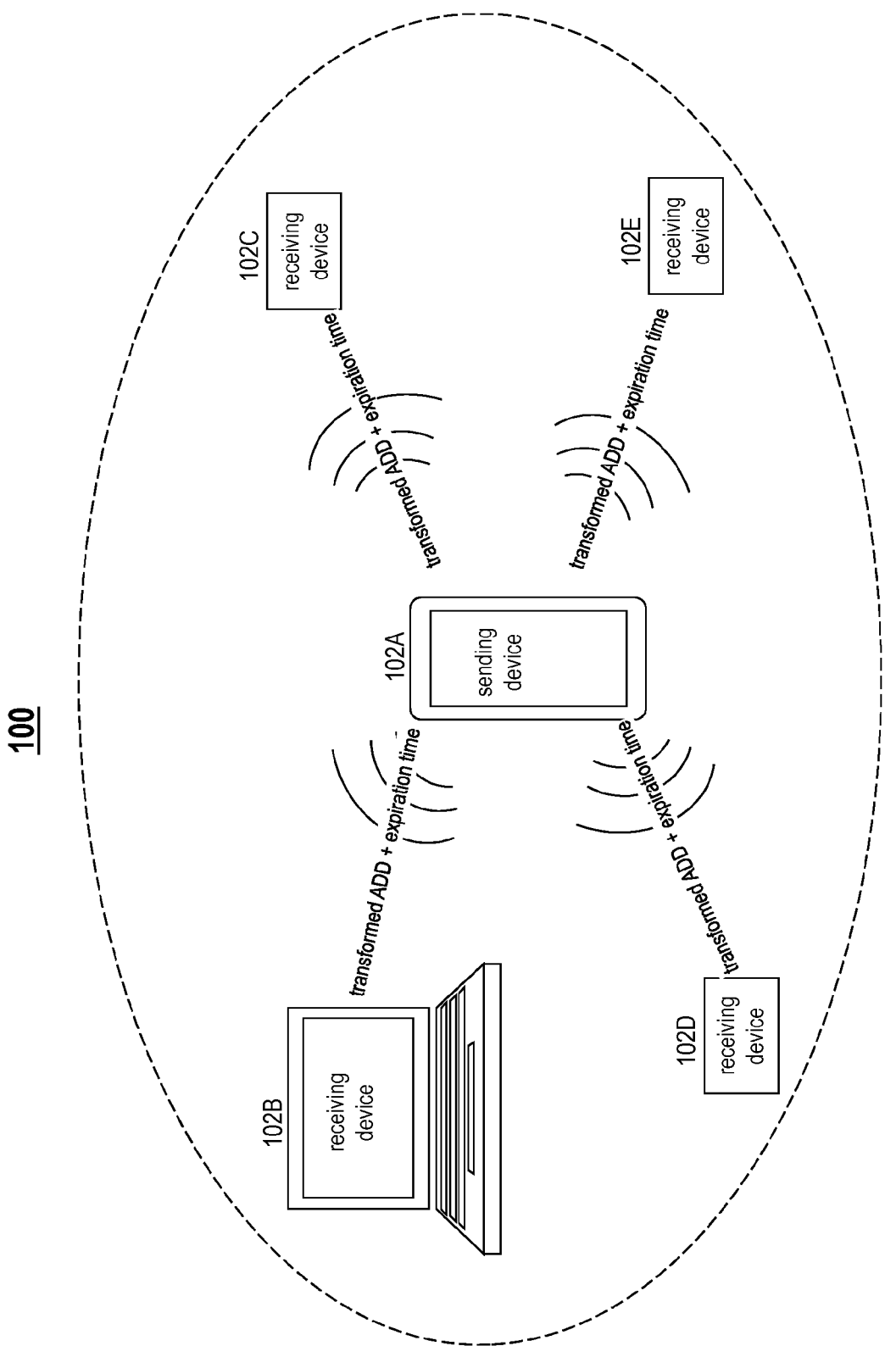
FIG. 1 depicts an overview of a wireless proximate-based communication system with privacy support, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed are systems, methods, and devices directed to wireless proximate-based communications with privacy support. A first wireless communication device is configured to discover and wirelessly communicate with one or more proximately-located wireless devices. The first wireless communication device includes logic configured to generate a temporary transformed address and expiration time and to format the temporary transformed address and expiration time into a packet and a communications module configured to transmit the packet directly to the one or more proximately-located wireless devices during discovery. The first wireless communication device is capable of exchanging information directly with the one or more proximately-located wireless devices based on the transformed address, until the expiration time has lapsed.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

With regard to the D2D discovery process of wireless proximity-based systems, the inventors have observed that by broadcasting a single fixed MAC address and subsequently maintaining that same fixed MAC address, privacy and security may be compromised. For example, upon a wireless device broadcasting service information along with its MAC address, another wireless device within the proximity of the wireless device may listen to the broadcasted service information and may store the MAC address and the service information of the received service information frames. Later, when the listening wireless device having the stored MAC address of the broadcasting wireless device hears the same MAC address again, it can discern that the same wireless device (or user) is again within its proximity. Thus, employing the same single fixed MAC address for the D2D discovery process as well as for subsequent transactions, facilitates the tracking of wireless devices by potentially untrustworthy sources and compromises user privacy and security.

Therefore, what is proposed is a wireless proximity-based communication system, apparatus, and method that employs a privacy support mechanism including a temporary transformed addresses and expiration time to reduce privacy and security susceptibility during the D2D discovery process.

With this said, FIG. 1 depicts an overview of wireless proximity-based communication system 100, in accordance with various aspects and principles of the present disclosure. The architecture of system 100 comprises wireless communication devices 102A-102E which are configured to wirelessly communicate directly each other via a wireless proximity-based communications protocol. For purposes of clarity, the embodiment of system 100 is depicted with wireless communication device 102A operating as a "sending" device while the remaining wireless devices 102B-102E are depicted as "receiving" devices. This is not intended to be limiting in any way, as the "sending" and "receiving" operations may easily be swapped among devices 102A-102E, in accordance with the principles of the present disclosure.

Wireless communication devices 102A-102E are configured to include the necessary circuitry, hardware, firmware, and software or any combination thereof to effect wireless proximity-based communication. Such devices may comprise, for example, a laptop, mobile device, cellular/smartphone, gaming device, tablet computer, a wireless-enabled patient monitoring device, personal communication system (PCS) device, personal digital assistant (PDA), personal audio device (PAD), portable navigational device, and/or any other electronic wireless-enabled device configured to receive a wireless signal. As such, wireless communication devices 102A-102E may be configured with variety of components, such as, for example, processor(s), memories, display screen, camera, input devices as well as communication-based elements. The communication-based elements may include, for example, antenna, interfaces, transceivers, modulation/demodulation and other circuitry, configured to wirelessly communicate and transmit/receive information. Wireless communication devices 102A-102E may also include a bus infrastructure and/or other interconnection means to connect and communicate information between various components and communication elements noted above.

Moreover, the processor(s) of the wireless communication devices 102A-102E may be part of a core processing or computing unit that is configured to receive and process input data and instructions, provide output and/or control other components of the wireless communication devices 102A-102E in accordance with embodiments of the present disclosure. Such processing elements may include a microprocessor, a memory controller, a memory and other components. The microprocessor may further include a cache memory (e.g., SRAM), which along with the memory may be part of a memory hierarchy to store instructions and data. The microprocessor may also include one or more logic modules such as a field programmable gate array (FPGA) or other logic array.

The memory of the wireless communication devices 102A-102E may take the form of a dynamic storage device coupled to the bus infrastructure and configured to store information, instructions, and application programs to be executed by the processor(s) or controller(s) associated of the wireless communication devices 102A-102E. Some or all of the memory may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Wireless communication devices 102A-102E may also include read only memory (ROM) and/or other static storage devices coupled to the bus infrastructure and configured to store static information and instructions for the processor(s) and/or controller(s) associated with the wireless devices 102A-102E.

As noted above, in system 100, wireless communication devices 102A-102E are configured to wirelessly communicate directly each other via a wireless proximity-based communications protocol. Wireless proximity-based communications protocol refers to a protocol configured to enable proximately-located devices to communicate directly with each other via wireless signals in a direct pairing manner. As such, the discovery of proximately-located devices and the establishment of communications between such devices may operate under a variety of wireless communication specification and standards, such as, for example, Wi-Fi, WiFi Direct, WiMax, WWAN, WLAN, WPAN, BlueTooth, BlueTooth Low Energy, Near Field Communications, ANSI/IEEE 802.11 Standard and its associated group of standards, such as, for example Part 11: Wireless LAN Medium Access Control (MAC) and Physical Layer (PHY) Specifications, Amendment 1 to Part 11, Amendment 3 to Part 11, P802.11u/D.8.0 Draft Standard, P802.11v/7.0 Draft Standard, Wi-Fi Alliance WMM™. Specification (including WMM™ Power Save) Specification version 1.1, Wi-Fi Alliance Technical Committee P2P Task Group WiFi Peer-to-Peer (P2P) Technical Specification version 1.0, and others.

It will, thus, be appreciated that the discovery and communications between sending wireless communication device 102A and receiving wireless communication devices 102B-102E are not limited to any specific standard and the examples discussed may be implemented separately or in combination with each other.

Returning to FIG. 1, during the D2D discovery process, sending wireless communications device 102A transmits a wireless signal to wireless communication devices 102B-102E within its proximity, containing a temporary transformed address and expiration time. In particular, prior to publishing its service capabilities or querying for service information during discovery, sending wireless device 102A generates a locally-administered transformed address (i.e., temporary pseudo-MAC address). The transformed address may be in the form of randomly-generated 46 bit number or a 46 bit hashed number from a uniformly-distributed number space. In some embodiments, for example, the transformed address may take the form of MAC_46 bits=H (original MAC address, current time value), where H is a hashing function.

Figure 2:
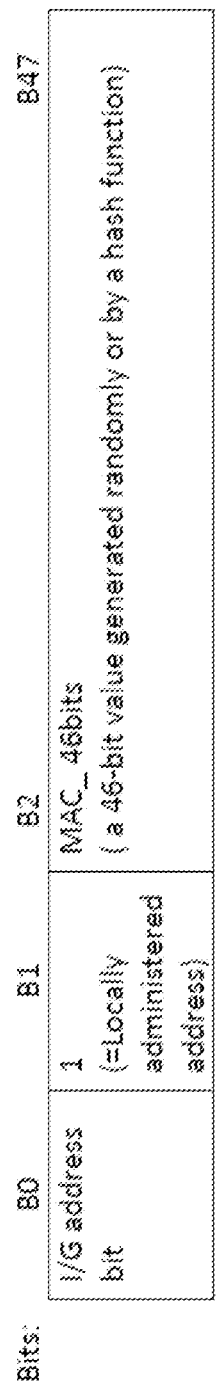
FIG. 2 depicts a transformed address framing format, in accordance with various aspects and principles of the present disclosure.

As shown in FIG. 2, in one embodiment, the temporary transformed address is encapsulated in a 48-bit address frame, where B0 corresponds to Individual (i.e., unicasting) or Group (i.e., broadcasting) address, B1 corresponds to a Globally Administered or Locally Administered address, and B2-B47 corresponds to the transformed address data.

As noted above, the temporary transformed address frame is included in a packet that also contains a predetermined expiration time indicating the interval of time in which the transformed address remains valid. That is, sending wireless device 102A maintains an expiration timer that starts to count down from the predetermined expiration time upon transmitting the packet that includes the transformed address frame and expiration time. Sending wireless device 102A then utilizes the transformed address for both transmitting frames and filtering received frames until the timer expires. After the lapse of the expiration time, sending wireless device 102A generates a new transformed address.

Upon receipt of the packet including the transformed address frame and expiration time transmitted by sending wireless device 102A, any or all of receiving wireless devices 102B-102E may store the transformed address and starts to run a timer with the initial value set to the timer value contained in the received packet. Any or all of receiving wireless devices 102B-102E will then utilized the stored temporary transformed address to communicate with sending wireless device 102A until the timer expires.

With regard to collision probabilities of the transformed address, it will be appreciated that uniqueness is still preserved, despite the transformed address being locally-administered and temporary. By way of illustration, consider a proximity neighborhood with n wireless devices, in which temporary transformed addresses are randomly assigned or subjected to a hash function. The probability that within the neighborhood of wireless devices, any two wireless devices choosing the same transformed address is: $1-(1-\frac{1}{2}^{46})*(1-2/246)*\ldots*(1-(n-1)/2^{46})$. So, when n=10,000, the probability is roughly $7.5*10^{-5}$%; when n=100,000, the probability is roughly $7.1*10^{-3}$%. Since it is very unlikely that a neighborhood would have more than 100,000 devices, the probability that a device selects a transformed address that collides with other devices is extremely small.

In this manner, communications or transactions initiated by wireless communications device 102A during the D2D discovery process, such as, publishing or querying for service, do not expose the true MAC address and identity of wireless device 102A, thereby minimizing potential tracking and privacy or security susceptibility.

Figure 3:
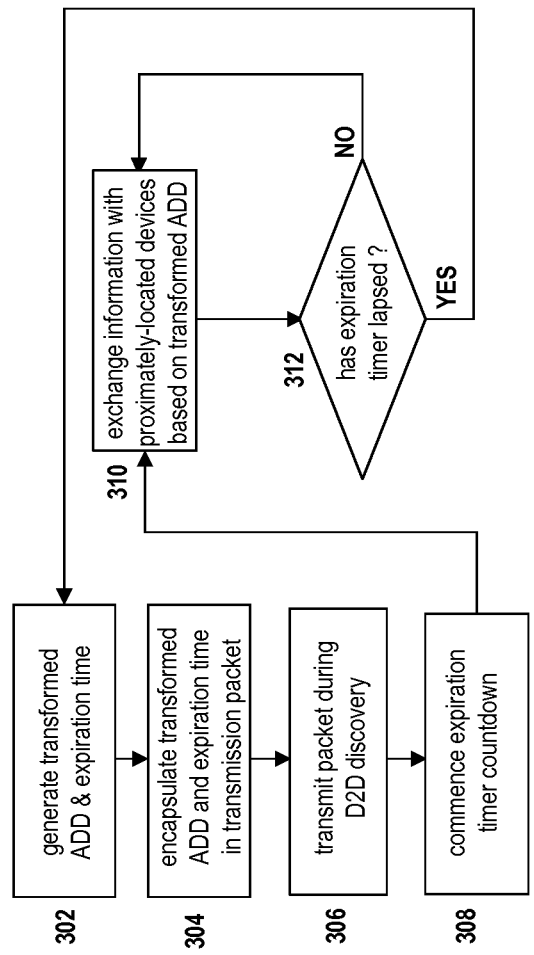
FIG. 3 depicts a process for wireless proximate-based communications having privacy support, in accordance with various aspects and principles of the present disclosure.

FIG. 3 depicts process 300 for effecting wireless proximate-based communications with privacy support, in accordance with various aspects and principles of the present disclosure. As depicted in FIG. 3, process 300 commences with the generation of the temporary transformed address and expiration time, at block 302. As noted above, sending wireless device 102A generates a locally-administered, temporary transformed address and an associated expiration time. The temporary transformed address may be in the form of randomly-generated 46 bit number or a 46 bit hashed number which is formatted in a 48 bit frame. The expiration time indicates the interval of time in which the temporary transformed address remains valid.

At block 304, process 300 initiates the encapsulation of the temporary transformed address and expiration time into a transmission packet which, in turn, is transmitted by sending wireless device 102A during the D2D discovery process, as indicated at block 306. As noted above, the packet is transmitted to any or all similarly-enabled wireless devices that are proximately located to device 102A, such as, for example, wireless communication devices 102B-102E of system 100. Moreover, the proximately-located devices store the temporary transformed address and run a timer with the initial value set to the timer value contained in the received packet. Any or all of proximately-located devices will utilize the stored temporary transformed address to communicate with sending wireless device 102A until the timer expires.

Upon transmitting the packet, at block 308, sending wireless device 102A commences the countdown of the expiration timer and, at block 320, wireless device 102A wirelessly communicates with or otherwise exchanges information with the proximately-located devices in a direct pairing fashion during the D2D discovery.

At block 312, process 300 determines whether the expiration timer of sending wireless device 102A has lapsed. If not, process 300 returns to block 310 where sending wireless device 102A may continue to exchange information with the proximately-located devices. However, if the expiration timer of sending wireless device 102A has lapsed, process 300 returns back to block 302, where sending wireless device 102A generates a new temporary address and expiration timer to subsequently iterate through the process again.

In some embodiments, processes may be implemented as a program product for implementing systems and methods as described above. Some embodiments can take the form of an entirely hardware embodiment, an entirely software embodiment, or an embodiment containing both hardware and software elements. One embodiment may be implemented in software, which includes but is not limited to firmware, resident software, microcode, etc.

Furthermore, embodiments may take the form of a computer program product (or machine-accessible product) accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

It will be appreciated that the readable medium may be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Moreover, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

EXAMPLES

The following examples pertain to further embodiments and/or aspects of the instant disclosure.

Example 1 is directed to a wireless communication system with privacy support that includes a first wireless communication device configured to discover and wirelessly communicate with one or more proximately-located wireless devices. In turn, the first wireless communication device includes logic configured to generate a temporary transformed address and an expiration time and to format the temporary transformed address and the expiration time into a packet; and a communications module configured to transmit the packet directly to the one or more proximately-located wireless devices during discovery. The first wireless communication device exchanges information with the one or more proximately-located wireless devices based on the transformed address until the expiration time has lapsed.

In Example 2, the subject matter of Example 1 may optionally provide that the temporary transformed address and expiration time are locally administered by the first wireless communication device.

In Example 3, the subject matter of Example 1 may optionally provide that the temporary transformed address comprises a randomly-generated number.

In Example 4, the subject matter of Example 1 may optionally provide the temporary transformed address comprises a hashed number based on a uniformly-distributed number space.

In Example 5, the subject matter of Example 1 may optionally provide that the temporary transformed address comprises a hashed number based on an original address of the first wireless communication device.

In Example 6, the subject matter of Example 1 may optionally provide that the first wireless communication device further includes an expiration timer that commences to count down from the expiration time upon transmitting the packet.

In Example 7, the subject matter of Example 1 may optionally provide that upon the expiration time lapsing, the first wireless communication device generates a new temporary transformed address.

In Example 8, the subject matter of Example 1 may optionally provide that upon the expiration time lapsing, the first wireless communication device generates a new expiration time.

In Example 9, the subject matter of Example 1 may optionally provide that the temporary transformed address is encapsulated in a 48-bit address frame.

In Example 10, the subject matter of Example 1 may optionally provide that the communications between the first wireless communication device and the one or more proximately-located wireless devices are based on one or more of the following communication protocols: Wi-Fi, WiFi Direct, WiMax, WWAN, WLAN, WPAN, BlueTooth, BlueTooth Low Energy, Near Field Communications, and ANSI/IEEE 802.11 Standard.

Example 11 is a directed to a method of providing wireless communications with privacy support that includes generating, by a first wireless communication device, a temporary transformed address and expiration time and formatting the temporary transformed address and expiration time into a packet; transmitting, by the first wireless communication device, the packet to one or more proximately-located wireless devices during a discovery process; and exchanging information between the first wireless communication device and the one or more proximately-located wireless devices based on the transformed address, until the expiration time has lapsed.

In Example 12, the subject matter of Example 11 may optionally include that the temporary transformed address and expiration time are locally administered by the first wireless communication device.

In Example 13, the subject matter of Example 11 may optionally include that the temporary transformed address comprises a randomly-generated number.

In Example 14, the subject matter of Example 11 may optionally include that the temporary transformed address comprises a hashed number based on a uniformly-distributed number space.

In Example 15, the subject matter of Example 11 may optionally include that the temporary transformed address comprises a hashed number based on an original address of the first wireless communication device.

In Example 16, the subject matter of Example 11 may optionally include that the first wireless communication device further includes an expiration timer that commences to count down from the expiration time upon transmitting the packet.

In Example 17, the subject matter of Example 11 may optionally include that upon the expiration time lapsing, the first wireless communication device generates a new temporary transformed address.

In Example 18, the subject matter of Example 11 may optionally include that upon the expiration time lapsing, the first wireless communication device generates a new expiration time.

In Example 19, the subject matter of Example 11 may optionally include that the formatting of the temporary transformed address includes encapsulating the temporary transformed address into a 48-bit address frame.

In Example 20, the subject matter of Example 11 may optionally include that the transmitting and exchanging information between the first wireless communication device and the one or more proximately-located wireless devices communications is based on one or more of the following communication protocols: Wi-Fi, WiFi Direct, WiMax, WWAN, WLAN, WPAN, BlueTooth, BlueTooth Low Energy, Near Field Communications, and ANSI/IEEE 802.11 Standard.

Example 21 is directed to a non-transitory computer readable medium bearing computer-executable instructions for providing wireless communications with privacy support, the instructions when executed performing the functions of generating, by a first wireless communication device, a temporary transformed address and expiration time and formatting the temporary transformed address and expiration time into a packet; transmitting, by the first wireless communication device, the packet to one or more proximately-located wireless devices during a discovery process; and exchanging information between the first wireless communication device and the one or more proximately-located wireless devices based on the transformed address, until the expiration time has lapsed.

In Example 22, the subject matter of Example 21 may optionally include that the temporary transformed address and expiration time are locally administered by the first wireless communication device.

In Example 23, the subject matter of Example 21 may optionally include that the temporary transformed address comprises a randomly-generated number.

In Example 24, the subject matter of Example 21 may optionally include that the temporary transformed address comprises a hashed number based on a uniformly-distributed number space.

In Example 25, the subject matter of Example 21 may optionally include that the temporary transformed address comprises a hashed number based on an original address of the first wireless communication device.

In Example 26, the subject matter of Example 21 may optionally include that the first wireless communication device further includes an expiration timer that commences to count down from the expiration time upon transmitting the packet.

In Example 27, the subject matter of Example 21 may optionally include that upon the expiration time lapsing, the first wireless communication device generates a new temporary transformed address.

In Example 28, the subject matter of Example 21 may optionally include that upon the expiration time lapsing, the first wireless communication device generates a new expiration time.

In Example 29, the subject matter of Example 21 may optionally include that the formatting of the temporary transformed address includes encapsulating the temporary transformed address into a 48-bit address frame.

In Example 30, the subject matter of Example 21 may optionally include that the transmitting and exchanging information between the first wireless communication device and the one or more proximately-located wireless devices communications is based on one or more of the following communication protocols: Wi-Fi, WiFi Direct, WiMax, WWAN, WLAN, WPAN, BlueTooth, BlueTooth Low Energy, Near Field Communications, and ANSI/IEEE 802.11 Standard.

Example 31 is directed to a computer-implemented method for providing wireless communications with privacy support that includes generating, by a first wireless communication device, a temporary transformed address and expiration time and formatting the temporary transformed address and expiration time into a packet; transmitting, by the first wireless communication device, the packet to one or more proximately-located wireless devices during a discovery process; and exchanging information between the first wireless communication device and the one or more proximately-located wireless devices based on the transformed address, until the expiration time has lapsed.

In Example 32, the subject matter of Example 31 may optionally include that the temporary transformed address and expiration time are locally administered by the first wireless communication device.

In Example 33, the subject matter of Example 31 may optionally include that the temporary transformed address comprises a randomly-generated number.

In Example 34, the subject matter of Example 31 may optionally include that the temporary transformed address comprises a hashed number based on a uniformly-distributed number space.

In Example 35, the subject matter of Example 31 may optionally include that the temporary transformed address comprises a hashed number based on an original address of the first wireless communication device.

In Example 36, the subject matter of Example 31 may optionally include that the first wireless communication device further includes an expiration timer that commences to count down from the expiration time upon transmitting the packet.

In Example 37, the subject matter of Example 31 may optionally include that upon the expiration time lapsing, the first wireless communication device generates a new temporary transformed address.

In Example 38, the subject matter of Example 31 may optionally include that upon the expiration time lapsing, the first wireless communication device generates a new expiration time.

In Example 39, the subject matter of Example 31 may optionally include that the formatting of the temporary transformed address includes encapsulating the temporary transformed address into a 48-bit address frame.

In Example 40, the subject matter of Example 31 may optionally include that the transmitting and exchanging information between the first wireless communication device and the one or more proximately-located wireless devices communications is based on one or more of the following communication protocols: Wi-Fi, WiFi Direct, WiMax, WWAN, WLAN, WPAN, BlueTooth, BlueTooth Low Energy, Near Field Communications, and ANSI/IEEE 802.11 Standard.

Example 41 is directed to a system for managing location service capabilities that includes the wireless device of any one of Examples 1-10.

Example 42 is directed to a computer-readable medium comprising computer-readable instructions physically embodied thereon which, when executed by a processor, causes the performance of the method of any one of Examples 11-20.

Example 43 is directed to an apparatus comprising means for performing the method of any one of Examples 11-20.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary aspects of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A wireless communication system with privacy support, comprising:
   a first wireless communication device configured to discover and wirelessly communicate with one or more proximately-located wireless devices, the first wireless communication device including:
   logic configured to generate a temporary transformed address and an expiration time and to format the temporary transformed address and the expiration time into a packet; and
   a communications module configured to transmit the packet directly to the one or more proximately-located wireless devices during discovery,
   wherein, the first wireless communication device exchanges information with the one or more proximately-located wireless devices based on the transformed address until the expiration time has lapsed.

2. The wireless communication system of claim 1, wherein the temporary transformed address and expiration time are locally administered by the first wireless communication device.

3. The wireless communication system of claim 1, wherein the temporary transformed address comprises a randomly-generated number.

4. The wireless communication system of claim 1, wherein the temporary transformed address comprises a hashed number based on a uniformly-distributed number space.

5. The wireless communication system of claim 1, wherein the temporary transformed address comprises a hashed number based on an original address of the first wireless communication device.

6. The wireless communication system of claim 1, wherein the first wireless communication device further includes an expiration timer that commences to count down from the expiration time upon transmitting the packet.

7. The wireless communication system of claim 1, wherein upon the expiration time lapsing, the first wireless communication device generates a new temporary transformed address.

8. The wireless communication system of claim 1, wherein upon the expiration time lapsing, the first wireless communication device generates a new expiration time.

9. The wireless communication system of claim 1, wherein the temporary transformed address is encapsulated in a 48-bit address frame.

10. The wireless communication system of claim 1, wherein communications between the first wireless communication device and the one or more proximately-located wireless devices are based on one or more of the following communication protocols: Wi-Fi, WiFi Direct, WiMax, WWAN, WLAN, WPAN, BlueTooth, BlueTooth Low Energy, Near Field Communications, and ANSI/IEEE 802.11 Standard.

11. The wireless communication system of claim 1, wherein the transmitting and exchanging information between the first wireless communication device and the one or more proximately-located wireless devices communications is based on one or more of the following communication protocols: Wi-Fi, WiFi Direct, WiMax, WWAN, WLAN, WPAN, BlueTooth, BlueTooth Low Energy, Near Field Communications, and ANSI/IEEE 802.11 Standard.

12. A method of providing wireless communications with privacy support, comprising:
   generating, by a first wireless communication device, a temporary transformed address and expiration time and formatting the temporary transformed address and expiration time into a packet;
   transmitting, by the first wireless communication device, the packet to one or more proximately-located wireless devices during a discovery process; and
   exchanging information between the first wireless communication device and the one or more proximately-located wireless devices based on the transformed address, until the expiration time has lapsed.

13. The method of claim 12, wherein the temporary transformed address and expiration time are locally administered by the first wireless communication device.

14. The method of claim 12, wherein the temporary transformed address comprises a randomly-generated number.

15. The method of claim 12, wherein the temporary transformed address comprises a hashed number based on a uniformly-distributed number space.

16. The method of claim 12, wherein the temporary transformed address comprises a hashed number based on an original address of the first wireless communication device.

17. The method of claim 12, wherein the first wireless communication device further includes an expiration timer that commences to count down from the expiration time upon transmitting the packet.

18. The method of claim 12, wherein upon the expiration time lapsing, the first wireless communication device generates a new temporary transformed address.

19. The method of claim 12, wherein upon the expiration time lapsing, the first wireless communication device generates a new expiration time.

20. The method of claim 12, wherein the formatting of the temporary transformed address includes encapsulating the temporary transformed address into a 48-bit address frame.

* * * * *